Sept. 20, 1960 O. E. MATTIAT 2,953,755

PIEZOELECTRIC CERAMIC FILTERS

Filed Nov. 17, 1958

INVENTOR,
OSKAR E. MATTIAT

BY Harry M. Saragovitz

ATTORNEY

United States Patent Office 2,953,755
Patented Sept. 20, 1960

2,953,755

PIEZOELECTRIC CERAMIC FILTERS

Oskar E. Mattiat, Santa Barbara, Calif., assignor to the United States of America as represented by the Secretary of the Army Filed Nov. 17, 1958, Ser. No. 774,566

4 Claims. (Cl. 333—72)

This invention relates to piezoelectric filters for alternating current waves and more particularly to piezoelectric disk filter-impedance transformers for radio frequencies.

In recent years, piezoelectric ceramic materials have found many new applications as electromechanical resonators and transducers. For some purposes, the use of ceramic substances is preferred over pure quartz crystals. Diverse modes of vibration can be induced in various known ceramics by suitably prepolarizing them in different directions, whereas the inherent structure of naturally found piezoelectric elements limits the modes of vibration in number and direction. The thin disk is particularly well suited for use as an electric resonator because of its excellent characteristics in the radial mode of vibration. A polarized disk responds to all excitations which induce resonant vibrations within the disk, i.e., it responds to excitations which induce the fundamental and several higher overtones. This activity is similar to a string of a violin which can be made to vibrate in the fundamental, the first, the second, or any higher overtone, depending on the applied excitation force. There are, however, several applications in which it is required that the resonator discriminate between different resonant modes of vibration. For example, it may be desired to make the resonator respond only to the second overtone and suppress the fundamental, the first, the third and all other higher overtones. A conventoinal method of accomplishing this desired suppression consists in mechanically mounting the disk in such a manner as to impede the undesired overtone resonant vibrations. The design of such a mechanical mounting device, however, is extremely complex and time consuming.

Accordingly, it is an object of this invention to provide an electric resonator capable of suppressing electrically the generation of neighboring resonant voltage overtones in a radially vibrating ceramic disk.

It is a further object of the present invention to improve the coupling efficiency of a second overtone resonator.

It is another object of the present invention to reduce the spurious response of a piezoelectric ceramic disk resonator.

It is an additional object of the present invention to use an electric resonator as a piezoelectric filter-transformer.

It is also an object of this invention to provide a circuit for a filter-transformer wherein the output signal is properly isolated from the input signal.

It is a further object of the invention to provide a resonator which is simple to construct, reliable in operation, and very stable.

These and other objects are obtained by using a thin piezoelectric ceramic disk having, on each main face a center and a ring electrode, a circumferential electrode, two input terminals connected to the center electrodes and an output terminal connected to the circumferential electrode. The disk is prepolarized as follows: in the portion of the disk between the center electrodes-in an axial direction, between the center electrodes and the ring electrodes-in a radial direction of one polarity; and between the ring electrodes and the circumferential electrode-in a radial direction of the opposite polarity. The electrodes on the disk are dimensioned to provide good coupling efficiency for second overtone operation.

The features of this invention which are believed to be novel are set forth with particularity in the appended claims. The present invention itself, both as to its organization and manner of operation, together with further objects and advantages thereof may best be understood by reference to the following description taken in connection with accompanying drawings, in which like reference characters refer to similar parts and in which:

Figure 1:
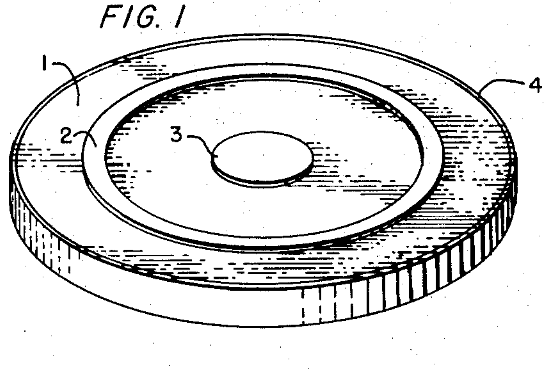
Fig. 1 is a perspective view of one embodiment of a piezoelectric ceramic filter-transformer disk showing the placement of the electrodes on the disk.

Referring now to Fig. 1, the piezoelectric disk 1 is made from a ceramic material which may be, for example only, barium titanate or barium titanate mixed with other titanates. The center electrode 3, the ring electrode 2, their respective counterparts 3′ and 2′ on the opposite side of the disk, and the circumferential electrode 4, are formed from any suitable conducting material such as silver, platinum, etc. These electrodes are applied to the disk in any desired fashion, since neither the electrode material nor its manner of application form any part of this invention.

Figure 2:
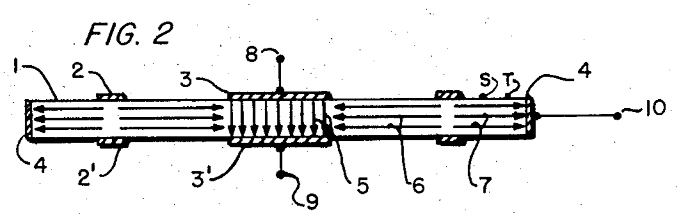
Fig. 2 is a cross-sectoinal view of the embodiment of Fig. 1 showing the prepolarization within the disk.

In Fig. 2, the axial polarization between the center electrodes is indicated by numeral 5, whereas the radial polarization within the disk is designated by numerals 6 and 7. As shown, the radial polarization within the disk is in opposite directions. The radial polarization may be performed by connecting the negative terminal of a suitable direct-current source to electrodes 3, 3′ and 4 and the positive terminal to electrodes 2 and 2′. Electrodes 2, 2′ are only used in the polarization of the disk. The axial polarization is accomplished by connecting a D.C. source across electrodes 3, 3′, electrode 3 being connected to the positive terminal. Other polarizing methods may be employed, the only requirement being that the relative directions of polarization be as shown in Fig. 2.

Figure 3:
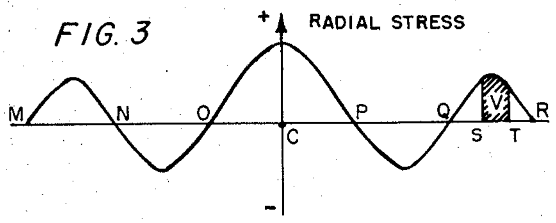
Fig. 3 is a graph showing the distribution of radial stress within the disk of Fig. 1 for second overtone operation.

Fig. 3 shows the stress distribution in a mechanically vibrating disk at the second overtone of the radial mode of vibration. The center of the disk is taken as the zero point on the X axis and the edges of the disk are plotted to the right and to the left of the center point. In second overtone operation the diameter of the disk is divided in 5 segments MN, NO, OP, PQ and QR. There is a vibrational phase difference of 180° between adjacent segments, as shown. The stress falls practically to zero at the rim of the disk. The magnitude of the stress at the center of the disk is somewhat greater than at the centers of the other segments.

Figure 4:
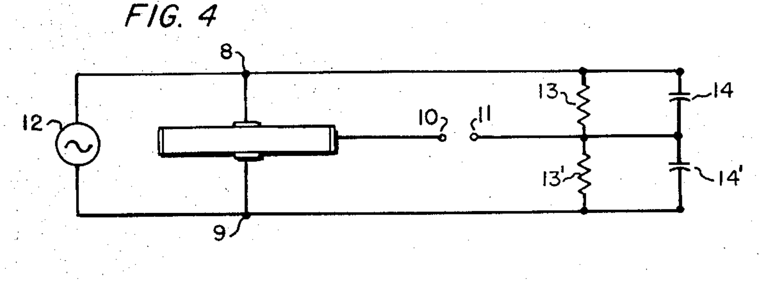
Fig. 4 is a circuit utilizing the disk of Fig. 1 as a voltage-impedance transformer.

In Fig. 4 a high frequency source 12 and two parallel R–C networks, 13, 14, and 13′, 14′ having a common terminal 11 are connected across the input terminals 8 and 9 of the filter of Fig. 1. The output signal is taken from terminals 10 and 11.

In operation, when a voltage signal, whose frequency corresponds to the second overtone, is applied to the center electrodes 3, 3′ an alternating electric field is created in the section of the disk between the center electrodes. This section is known in the art as the "driving section." Similarly, the remaining portion of the disk between the center electrodes and the circumferential electrode is known as the "driven" section. The alternating electric field being parallel to the axial polarization produces, due to the piezoelectric properties of the ceramic material, stresses and strains within the entire disk. At resonance these strains will be greatly intensified and the radial stress distribution within the disk will be as shown in Fig. 3. These vibrational stresses produce within the disk, as a result of its inverse piezoelectric properties, voltage gradients the polarity of which depends on the direction of polarization. The total output voltage between a pair of electrode terminals is the integral in the radial direction of all the voltage gradients between these terminals. Therefore, the total output voltage between two points on the disk can be represented by the area enclosed by the voltage distribution curve between these points. Were the radial polarization within the driven section in one direction, as for example in the direction indicated by numeral 7, the voltage distribution curve for second overtone operation of the disk of Fig. 1 would have the same shape as the radial distribution curve of Fig. 3, and the potential difference between two points S, T in Fig. 2 could be graphically represented by area V in Fig. 3 enclosed by the curve and two parallel lines erected perpendicularly to the X axis from these points. Also, the output voltage between the center electrode and the circumferential electrode would be primarily determined by the enclosed area between points C and R. By noting that the enclosed areas between points P, Q, and Q, R are 180° out of phase, and that the voltage on any point of a conductive electrode is the same, it may be readily seen that the output voltage between terminals 8 and 10 or 9 and 10 would be very small.

In accordance with this invention the driven section is polarized in opposite radial directions, as shown in Fig. 2, which causes the voltage gradients between points P, Q and O, N on one hand, and Q, R and N, M on the other hand to be in phase. Consequently, the output voltage which is the integral of all the potential gradients between the output terminals becomes greatly enhanced. Using the same reasoning as above, it can be easily shown that the fundamental and the first overtone will not produce appreciable voltages across the output terminals. The above theoretical considerations have been experimentally verified in the laboratory.

Although the use of the filter-transformer of Fig. 2 is not limited to any specific circuit, the arrangement of Fig. 4 was found very satisfactory. The R–C networks represent two balanced loads for symmetrical operation. The output voltage between points 10, 11 was found to be free of spurious responses within the disk. An advantage of the circuit of Fig. 4 is that the output impedance locking into terminals 10 and 11 is isolated from the input impedance looking into terminals 8 and 9. Moreover, the input and output terminals can be reversed if desired, i.e., the input signal applied to terminals 10, 11 and the output taken from terminals 8 and 9. The output impedance can be conveniently varied by reducing the thicknes sof the disk or by making grooves between the driving and the driven sections which results in a reduction of the coupling efficiency within the disk. Also, the output circuit of the disk can be made to have two independent output electrodes instead of having a common electrode 3' with the input circuit, as shown in Fig. 2. The location of a fourth electrode should preferably be at a point of minimum radial stress.

Although the filter-transformer has been described as operating at the second overtone, it should be clearly understood that the invention is not so limited. In general, for $n^{th}$ overtone operation and for maximum output voltage, the direction of radial polarization is made to be in phase with the stress distribution. For example when $n=2$, as shown in Fig. 3, the radial polarization is away from the center for positive radial stress and towards the center for negative radial stress. Once a piezoelectric disk is polarized to operate in a desired overtone it will automatically discriminate against spurious overtones.

Hence, by suitably polarizing the ceramic disk according to this invention, an electric resonator is provided which is capable of suppressing electrically the generation of neighboring resonant voltage overtones in a radially vibrating disk. While this invention has been described in conjunction with second overtone operations and with present preferred embodiments, it should be apparent that the invention is not limited thereto.

What is claimed is:

1. In combination, a thin disk-shaped piezoelectric ceramic filter having an upper and a lower main face, a center electrode on each main face, a circumferential electrode, the portion of the disk between the center electrodes being axially polarized and the remaining portion being radially polarized, the direction of radial polarization being in phase with the mechanical radial stresses, a high frequency oscillator, two symmetrical load devices having a common junction, means for connecting the output of said oscillator across said center electrodes and said load devices, and means for deriving an output signal between said junction and said circumferential electrode.

2. In the combination according to claim 1, wherein the frequency of said oscillator corresponds to an overtone of said disk.

3. A thin disk-shaped piezoelectric ceramic filter having two main faces, a center electrode on each main face, a circumferential electrode; electrical means connected to the center electrodes for exciting said filter into second overtone vibration, the portion of the disk between the center electrodes being axially polarized and the remaining portion of the disk being radially polarized in two oppositely polarized portions to be in phase with the mechanical radial stresses which are induced therein when said filter vibrates in said second overtone.

4. A thin disk-shaped piezoelectric ceramic filter having two main faces, a center electrode on each main face, a circumferential electrode; means for exciting said filter into said second overtone vibration, the portion of the disk between the center electrodes being axially polarized and the remaining portion of the disk being radially polarized, the directions of radial polarization within said remaining portion being in phase with the mechanical radial stresses which are induced therein when said filter vibrates in said second overtone.

References Cited in the file of this patent

UNITED STATES PATENTS

| | | |
|---|---|---|
| 2,262,966 | Rohde | Nov. 18, 1941 |
| 2,596,460 | Arenberg | May 13, 1952 |
| 2,830,274 | Rosen et al. | Apr. 8, 1958 |